United States Patent
Tangpong et al.

(10) Patent No.: US 11,799,795 B2
(45) Date of Patent: Oct. 24, 2023

(54) DISTRIBUTING SHAPED SUB INTERFACES TO MEMBER PORTS OF A PORT CHANNEL

(71) Applicant: Arista Networks, Inc., Santa Clara, CA (US)

(72) Inventors: Athichart Tangpong, Sunnyvale, CA (US); Rajnish Gupta, Fremon, CA (US); Francois Labonte, Menlo Park, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 19 days.

(21) Appl. No.: 17/333,240

(22) Filed: May 28, 2021

(65) Prior Publication Data

US 2022/0385592 A1    Dec. 1, 2022

(51) Int. Cl.

| | |
|---|---|
| *H04L 12/873* | (2013.01) |
| *H04L 47/52* | (2022.01) |
| *H04L 47/22* | (2022.01) |
| *H04L 47/78* | (2022.01) |
| *H04L 41/0896* | (2022.01) |
| *H04L 47/28* | (2022.01) |

(52) U.S. Cl.
CPC ........ *H04L 47/522* (2013.01); *H04L 41/0896* (2013.01); *H04L 47/225* (2013.01); *H04L 47/28* (2013.01); *H04L 47/781* (2013.01)

(58) Field of Classification Search
None
See application file for complete search history.

(56) References Cited

U.S. PATENT DOCUMENTS

2009/0178088 A1* 7/2009 Liu .................. H04N 21/64738
725/87

OTHER PUBLICATIONS

Cisco. "Quality of Service for Etherchannel Interfaces." QoS Modular QoS Command-Line Interface Configuration Guide, Cisco IOS XE Everest 16.6 [Cisco ASR 1000 Series Aggregation Services Routers], Apr. 20, 2018, https://www.cisco.com/c/en/us/td/docs/ios-xml/ios/qos_mqc/configuration/xe-16-6/qos-mqc-xe-16-6-book/qos-eth-int.html (28 pages).

(Continued)

*Primary Examiner* — Kouroush Mohebbi
(74) *Attorney, Agent, or Firm* — Sprinkle IP Law Group (57) ABSTRACT

Embodiments described herein relate to techniques for distributing shaped subinterfaces among physical interfaces of a port channel. Such techniques include receiving a request to configure a shape rate for a port channel subinterface; generating a physical interface set specifying: a first physical interface and a first allocated bandwidth associated with the first physical interface; and a second physical interface and a second allocated bandwidth associated with the second physical interface; making a selection, using the physical interface set, of the first physical interface based on the first allocated bandwidth being lesser than the second allocated bandwidth; assigning the first physical interface as a first anchor interface for the first port channel subinterface; and adding the first shape rate to the first allocated bandwidth to obtain a first new allocated bandwidth for the first physical interface.

20 Claims, 7 Drawing Sheets

(56) References Cited

OTHER PUBLICATIONS

Cisco. "Flow-Based per Port-Channel Load Balancing." LAN Switching Configuration Guide, Cisco IOS XE Release 3S [Cisco IOS XE 3S], Jan. 21, 2018, <https://www.cisco.com/c/en/us/td/docs/ios-XML/ios/lanswitch/configuration/xe-3s/lanswitch-xe-3s-book/lnsw-flow-portchannel-load.html> (12 pages).

Roten, David. "QoS Configuration Migrations From Classic IOS to IOS XE." Imagine Intuitive, Cisco, Jun. 10, 2018, <www.ciscolive.com/c/dam/r/ciscolive/us/docs/2018/pdf/BRKARC-2031.pdf.> (115 pages).

\* cited by examiner

| Physical Interface | Allocated Bandwidth (Gbps) |
|---|---|
| Eth1 | 0 |
| Eth2 | 5 |
| Eth3 | 15 |

Port Channel Physical Interface List 300

FIG. 3A

| Physical Interface | Available Bandwith (Gbps) |
|---|---|
| Eth2 | 5 |
| Eth1 | 10 |
| Eth3 | 15 |

Port Channel Physical Interface List 310

FIG. 3B

DISTRIBUTING SHAPED SUB INTERFACES TO MEMBER PORTS OF A PORT CHANNEL

BACKGROUND

Data is often transferred between and/or within devices in a network. Such data may be propagated to and/or from network devices. Network devices often have interfaces that provide connectivity to other devices. In some cases, interfaces of a network device may be grouped together to form an aggregate logical interface, which may be referred to as a port channel. The capacity (e.g., bandwidth) of a port channel may be shared among two or more entities that transmit and/or receive network traffic.

DETAILED DESCRIPTION

Specific embodiments will now be described with reference to the accompanying figures.

In general, embodiments described herein relate to method, systems, and instructions stored on non-transitory computer readable mediums for distributing port channel subinterfaces among physical interfaces of a port channel.

In one or more embodiments, physical interfaces (i.e., ports) of a network device may be aggregated, and the set of aggregated physical interfaces may be referred to as a port channel. In one or more embodiments, subinterfaces are configured for port channels (i.e., port channel subinterfaces). In one or more embodiments, it may be desired for network traffic for such a subinterface to be load balanced among the physical interfaces of a port channel Additionally, a port channel subinterface may be configured with a desired shape rate, which is an amount of bandwidth that the subinterface may use.

For example, a subinterface may be configured with a shape rate of 5 Gbps on a port channel with two physical interfaces (each with more than 5 Gbps of bandwidth). In order to load balance among member ports of a port channel for the subinterface, a shape rate of 2.5 Gbps may be applied for each of the two physical interfaces for traffic of the subinterface, giving an aggregate shape rate of 5 Gbps for the subinterface (at least in the case of perfect load balancing). However, situations often arise in which load balancing is less than perfect. In such situations, the effective shape rate for the subinterface may be less than the desired shape rate (e.g., less than 5 Gbps in this example scenario). At worst, all network traffic for a subinterface may be load balanced to a single physical interface, which, in this example, would make the effective shape rate only 2.5 Gbps for the subinterface, instead of the intended 5 Gbps.

Embodiments described herein address the above-described problem by assigning an anchor interface for port channel subinterfaces for which a shape rate is configured, with the anchor interface having a bandwidth amount that is at least equal to the desired shape rate for the subinterface.

More specifically, in one or more embodiments, when a subinterface of a port channel is configured with a shape rate, a listing of all physical interfaces of the port channel is obtained. Next, in one or more embodiments, all ineligible physical interfaces (e.g., interfaces that are down) are filtered from the list. Next, in one or more embodiments, the list is ranked in ascending order based on allocated bandwidth. Next, in one or more embodiments, the available interface at the top of the list (i.e., with the least allocated bandwidth) is assigned as the anchor interface for the subinterface. Then, in one or more embodiments, the shape rate for the subinterface is added to the allocated bandwidth for the selected physical interface. This process is then repeated for each port channel subinterface for which a shape rate is configured.

In one or more embodiments, in the event that a port channel subinterface is a part of a subinterface group, the amount added after assigning the anchor interface is the shape rate of the group instead of the shape rate of the individual subinterface. In one or more embodiments, when the process is executed for additional members of the group, they are assigned to the same anchor interface, and no further addition to the anchor interface's allocated bandwidth is performed.

In one or more embodiments, if a situation arises in which a port channel subinterface that is a member of a group is to be assigned, and there is a tie between two or more physical interfaces having the same allocated bandwidth, then the physical interface with less bandwidth already assigned to other groups is selected as the anchor interface. In one or more embodiments, in the event that a subinterface that has already been assigned an anchor interface subsequently gets added to a group, the assignment may be discarded, and the process may be re-performed.

Embodiments described herein may also make use of a retry set (e.g., a list), which is a list that may include, at least in part, subinterfaces for which the assigned anchor interface became unavailable. In one or more embodiments, the retry set may also include subinterfaces that could not be assigned to an anchor interface for any reason (e.g., when there are no eligible anchor interfaces). In one or more embodiments, the subinterfaces on the retry set may be checked at various times to attempt to assign them to an anchor interface. In one or more embodiments, such times include after the expiration of a retry timer for subinterfaces that lost their anchor interface, and when a new physical interface is added to a port channel.

Embodiments described herein address the problem of a port channel subinterface with a shape rate configured getting less than the configured shape rate of bandwidth due to imperfect load balancing. In one or more embodiments, this is achieved, at least in part, by assigning subinterfaces to an anchor interface that has enough bandwidth for the entire shape rate, and sending all traffic of the subinterface through the anchor interface. At least some load balancing is still achieved by algorithmically distributing the subinterfaces to anchor interfaces within the port channel based on the allocated bandwidth of the port channel physical interfaces when assigning the subinterfaces to an anchor interface. A degree of subinterface group load balancing is also achieved by using the amount of bandwidth already assigned for other groups on port channel physical interfaces when deciding between two or more physical interfaces that overall have the same amount of allocated bandwidth, with the physical interface having less bandwidth assigned to groups being selected for the new group anchor interface assignment.

Figure 1:
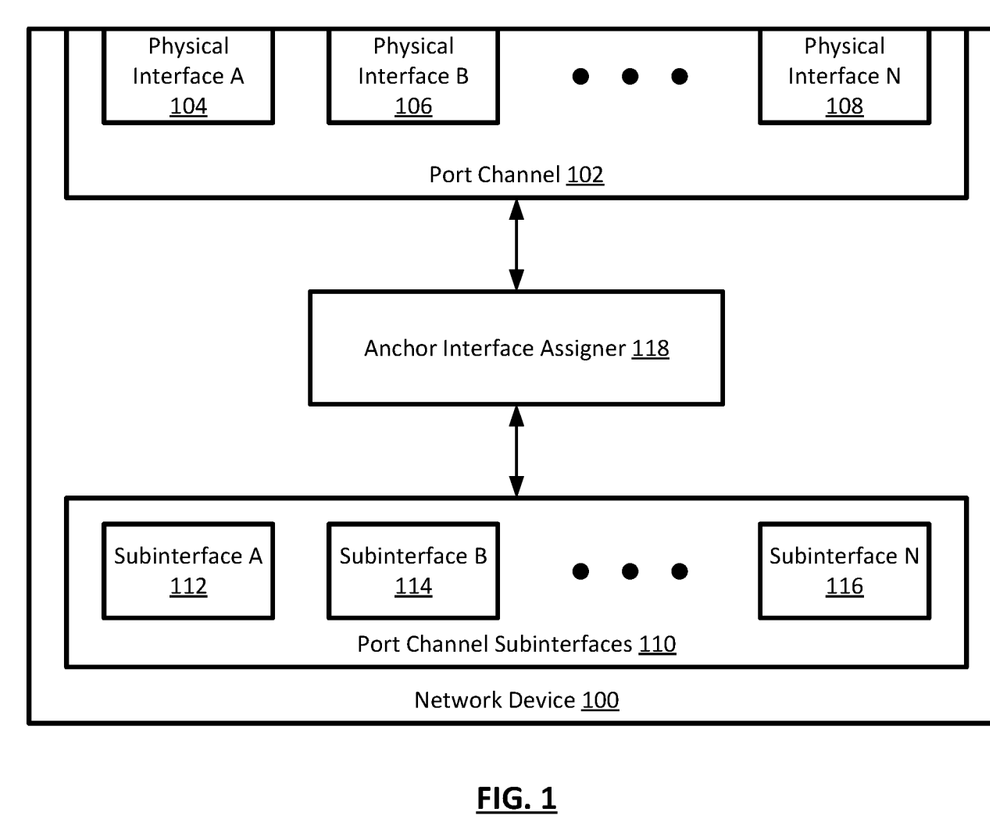
FIG. 1 shows a system for distributing port channel subinterfaces in accordance with one or more embodiments described herein.

FIG. 1 shows a system in accordance with one or more embodiments described herein. As shown in FIG. 1, the system includes network device (100). Network device (100) may include port channel (102). Port channel (102) may include any number of physical interfaces (e.g., physical interface A (104), physical interface B (106), physical interface N (108)). Network device (100) may also include port channel subinterfaces (110). Port channel subinterfaces (110) may include any number of subinterfaces (e.g., subinterface A (112), subinterface B (114), subinterface N (116)). Network device (100) may also include anchor interface assigner (118). Each of these components is described below.

In one or more embodiments, network device (100) is a device that includes and/or is operatively connected to persistent storage (not shown), memory (e.g., random access memory (RAM)) (not shown), one or more processor(s) (e.g., integrated circuits) (not shown), and at least one physical network interface (e.g., physical interface A (104)) (which may also be referred to as a port), which may provide connections (i.e., links) to other devices (e.g., computing devices, other network devices, etc.). In one or more embodiments, network device (100) also includes any number of additional components (not shown), such as, for example, network chips, field programmable gate arrays (FPGAs), application specific integrated circuits (ASICs), indicator lights (not shown), fans (not shown), etc. Network device (100) may include any other components without departing from the scope of embodiments described herein.

In one or more embodiments, network device (100) includes any software configured to perform various functions of the network device (e.g., to process packets). Such software may, for example, execute using one or more processors of a network device, or any other hardware resource of a network device capable of executing software.

Examples of a network device, such as network device (100) include, but are not limited to, a network switch, a router, a multilayer switch, a fibre channel device, an InfiniBand® device, etc. A network device is not limited to the aforementioned specific examples.

In one or more embodiments, network device (100) includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of network traffic data unit processing include, but are not limited to, performing a determining: (i) whether to take a security action (e.g., drop the network traffic data unit); (ii) whether to mirror the network traffic data unit; and/or (iii) how to route/forward the network traffic data unit in order to transmit the network traffic data unit from an interface of network device (100).

In one or more embodiments, network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., network devices) that facilitate network connectivity for one or more operatively connected devices (e.g., computing devices, data storage devices, other network devices, etc.) (not shown). In one or more embodiments, a network device and other devices within the network are arranged in a network topology (not shown). In one or more embodiments, a network topology is an arrangement of various devices of a network.

In one or more embodiments, the persistent storage and/or memory (not shown) of network device (100) may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of network device (100) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of network device (100), cause the one or more processors and/or other hardware components to perform operations in accordance with one or more embodiments described herein.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, network device (100) includes at least two physical interfaces (e.g., physical interface A (104) and physical interface B (106)). In one or more embodiments, physical interfaces (104, 106, 108) are any hardware, software, or combination thereof that include functionality to receive and/or transmit network traffic data units or any other information to or from network device (100). Physical interfaces (104, 106, 108) may include any interface technology, such as, for example, optical, electrical, etc. Physical interfaces (104, 106, 108) may be configured to interface with any transmission medium (e.g., optical fiber, copper wire(s), etc.).

In one or more embodiments, physical interfaces (104, 106, 108) include and/or are operatively connected to any number of components used in the processing of network traffic data units. For example, a given physical interface may include a PHY (not shown), which is circuitry that connects a physical information propagation medium (e.g., a wire) to other components, which process the information. In one or more embodiments, physical interfaces (104, 106, 108) include and/or are operatively connected to a transceiver, which provides the connection between the physical information transmission medium and the PHY. A PHY may also include any number of other components, such as, for example a serializer/deserializer (SERDES), and encoder/decoder, etc. A PHY may, in turn, be operatively connected to other any number of other components, such as, for example, a media access control (MAC) sublayer. Such a sublayer, may, in turn, be operatively connected to still other higher layer processing components, all of which form a series of components used in the processing of network traffic data units being received or transmitted.

In one or more embodiments, physical interfaces have an associated bandwidth. In one or more embodiments, bandwidth of a physical interface is a throughput capacity of the interface. Bandwidth may be measured in bits per second (e.g., gigabits per second (Gbps)). Any other quantification of bandwidth may be used without departing from the scope of embodiments discussed herein.

In one or more embodiments, any physical interfaces (104, 106, 108) of network device (100) may be part of port channel (102). In one or more embodiments, a port channel (e.g., port channel (102)) is a communication link between two network devices supported by matching channel group interfaces on each network device. A port channel (e.g., port channel (102)) may also be referred to as a Link Aggregation Group (LAG). In one or more embodiments, port channels (e.g., port channel (102)) combine the bandwidth of multiple physical interfaces (e.g., 104, 106, 108) into a single logical link. A port channel (e.g., 102) may be a set of physical interfaces on a single network chip of network device (100), or may span physical interfaces of two or more network chips. Any selection of physical interfaces of a network device that are logically grouped together may be considered a port channel without departing from the scope of embodiments described herein.

In one or more embodiments, network device (100) includes any number of port channel subinterfaces (110) associated with a given port channel (e.g., port channel (102)). In one or more embodiments, subinterfaces (e.g., 112, 114, 116) divide a single port channel into multiple logical interfaces (e.g., based on virtual local area network (VLAN) tags of incoming network traffic). In one or more embodiments, subinterfaces (112, 114, 116) are used in boundary devices (e.g., devices at the boundary between layer 2 and layer 3 network traffic protocols), and may also be used to isolate traffic with VLAN tags between network device peers by assigning each subinterface to a different virtual routing and forwarding (VRF) instances.

In one or more embodiments, subinterfaces (112, 114, 116) may be assigned to and/or used by different entities. As an example, an entity having network device (100) may aggregate physical interfaces (104, 106, 108) into port channel (102). The entity may then configure port channel (102) to be used by any number of different customers. In one or more embodiments, such sharing may be achieved, at least in part, by creating subinterfaces (112, 114, 116) of port channel (102), and assigning each customer to a different one or more subinterfaces.

In one or more embodiments, each subinterface (112, 114, 116) of port channel (102) may have a configured shape rate. In one or more embodiments, a shape rate is an amount of bandwidth that the subinterface is to use when transmitting and/or receiving network traffic. How to implement a shape rate for a subinterface of a port channel is discussed further in the descriptions of FIGS. 2A-2E, below.

In one or more embodiments, network device (100) includes anchor interface assigner (118). In one or more embodiments, anchor interface assigner (118) is any hardware (e.g., circuitry), software, firmware, or any combination thereof, that includes functionality to assign a physical interface (e.g., 104, 106, 108) of a port channel (e.g., port channel (102)) as an anchor interface for a subinterface (112. 114, 116) of a port channel (102). In one or more embodiments, an anchor interface is a physical interface, assigned to a subinterface, through which network traffic for the subinterface is received by or transmitted from network device (100). The techniques used by anchor interface assigner (118) for assigning anchor interfaces to subinterfaces are discussed further in the descriptions of FIGS. 2A-2E, below.

While FIG. 1 shows a configuration of components, other configurations may be used without departing from the scope of embodiments described herein. For example, a network device may have any number of port channels. As another example, a port channel may have any number of physical interfaces, any number of subinterfaces, etc. Accordingly, embodiments disclosed herein should not be limited to the configuration of devices, elements, and/or components shown in FIG. 1.

Figure 2A:
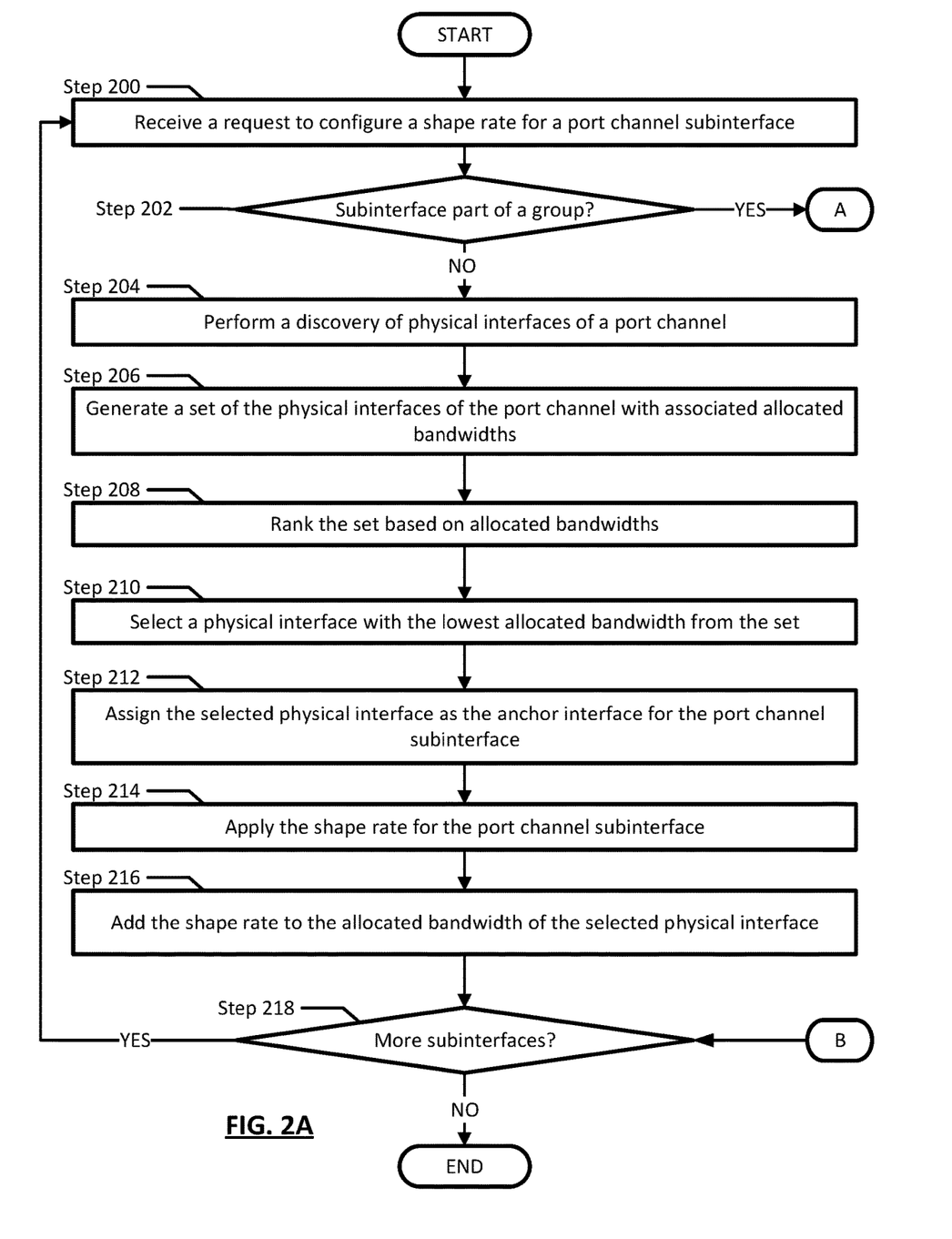
FIG. 2A shows a flowchart of a method for distributing port channel subinterfaces in accordance with one or more embodiments described herein.

FIG. 2A shows a flowchart describing a method for assigning anchor interfaces to port channel subinterfaces in accordance with one or more embodiments described herein. The method for assigning anchor interfaces to port channel subinterfaces shown in FIG. 2A is only one example of a particular scheme for assigning anchor interfaces to port channel subinterfaces. Accordingly, embodiments described herein should not be considered limited to the specific process shown in FIG. 2A.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that steps other than those shown in FIG. 2A may be performed.

In Step 200, a request is received to configure a shape rate for a port channel subinterface on a network device. Such a request may be received from any entity using any technique for configuring a shape rate for a port channel interface. As an example, a script may be executed to perform commands in a command line interface (CLI) of a network device, and one or more of the commands may be performed to configure a shape rate for a port channel subinterface. In one or more embodiments, the request to configure a port channel subinterface includes, at least, a bandwidth value for the shape rate. The bandwidth value may be any quantity that represents bandwidth. For example, the request may specify a shape rate of 5 Gbps for a given port channel subinterface. In one or more embodiments, the request may be part of a larger request in which configuration of a shape rate for any number of subinterfaces is received.

In Step 202, a determination is made as to whether the subinterface is part of a subinterface group. In one or more embodiments, a subinterface group is any logical grouping of subinterfaces of a network device. In one or more embodiments, if the subinterface for which a shape rate is requested is part of a subinterface group, the method proceeds to FIG. 2B. In one or more embodiments, if the subinterface for which a shape rate is requested is not part of a group, the method proceeds to Step 204.

In Step 204, an anchor interface assigner performs a discovery of physical interfaces of a port channel. In one or more embodiments, the port channel is a port channel that is associated with the port channel subinterface. In one or more embodiments, the physical interfaces are the set of interfaces that are aggregated to form the port channel of a network device. The discovery of the physical interfaces of the port channel may be performed using any scheme for discovering information of a network device. In one or more embodiments, each physical interface in the set has a total bandwidth that is greater than or equal to the shape rate requested in Step 200.

As an example, an anchor interface assigner may perform a query to port channel information stored in storage of a network device, and the query may return a listing of the physical interfaces of the port channel. In one or more embodiments, the query returns the list of physical interfaces, along with additional information associated with the physical interfaces. Such information may include, but is not limited to, the total bandwidth for the physical interface, whether the physical interface is currently operational, the total number of subinterfaces associated with the physical interface, the amount of bandwidth allocated to the physical interface to facilitate shape rates for subinterfaces associated with the physical interface, etc. Any other items of information associated with physical interfaces may be included with the list of physical interfaces without departing from the scope of embodiments described herein.

In Step 206, a set (e.g., a list) of physical interfaces is generated, along with the allocated bandwidth for each physical interface in the set. In one or more embodiments, the allocated bandwidth for each physical interface represents the aggregate bandwidth of the shape rates of port channel subinterfaces associated with the physical interface. In one or more embodiments, the allocated bandwidth is less than the total amount of bandwidth of the physical interface. In one or more embodiments, the allocated bandwidth is equal to or greater than the total bandwidth of the physical interface (e.g., the physical interface is over-subscribed).

In one or more embodiments, generating the set includes filtering the set to remove one or more physical interfaces. A physical interface may be removed from the set for any reason. As an example, a physical interface may be removed because the physical interface is currently down. As another example, a physical interface may be removed because the physical interface already has a quantity of subinterfaces associated with it that is equal to a physical interface subinterface limit. In one or more embodiments, the generating of the set of physical interfaces is performed by an anchor interface assigner.

In Step 208, the set of physical interfaces generated in Step 206 is ranked based on allocated bandwidth. In one or more embodiments, the ranking orders the physical interfaces in ascending order, with physical interfaces having more allocated bandwidth being lower on the ranked list than physical interfaces having less allocated bandwidth. In one or more embodiments, the ranking of the set of physical interfaces is performed by an anchor interface assigner.

In Step 210, the physical interface having the lowest allocated bandwidth is selected from the set. In one or more embodiments, the selected physical interface is the interface at the top of the ranked list of physical interfaces created in Step 208.

In Step 212, the physical interface selected in Step 210 is assigned to the subinterface for which the request in Step 200 was received, as the anchor interface for the port channel subinterface. In one or more embodiments, the assignment is made using any scheme for associating items with one another. For example, the assignment may be a stored association between the physical interface and the subinterface stored in storage and/or memory of a network device.

In Step 214, the shape rate for the port channel subinterface is applied. In one or more embodiments, applying the shape rate includes configuring the physical interface to allow network traffic to be transmitted from and/or received by the subinterface in an amount that is less than or equal to the shape rate for the subinterface. As an example, a shape rate of 5 Gbps may be configured for a subinterface, after which network traffic to be set from and/or received by the subinterface may be any quantity from 0 Gbps to 5 Gbps.

In Step 216, the shape rate for the subinterface is added to the allocated bandwidth associated with the physical interface. In one or more embodiments, adding the shape rate includes adding the quantity of bits per second of the shape rate to the aggregate amount of bandwidth allocated to the physical interfaces for other subinterfaces associated with the physical interface.

In Step 218, a determination is made as to whether there are any additional subinterfaces for which a shape rate is to be configured. In one or more embodiments, if there are additional subinterfaces, the method returns to Step 200, and the process is repeated for the additional subinterface. In one or more embodiments, if there are no additional subinterfaces, the method ends.

Figure 2B:
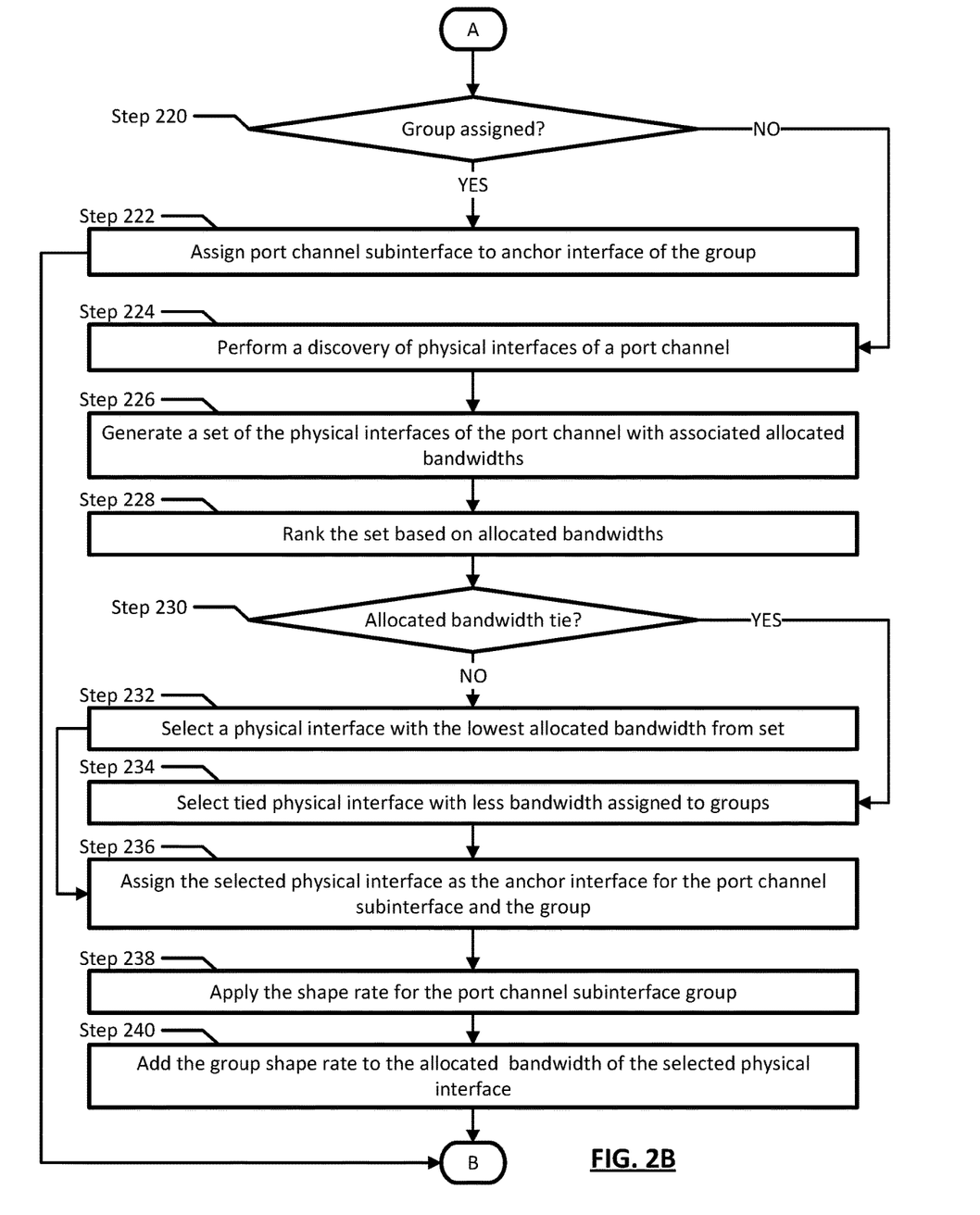
FIG. 2B shows a flowchart of a method for distributing port channel subinterfaces of a group in accordance with one or more embodiments described herein.

FIG. 2B shows a flowchart describing a method for assigning anchor interfaces to port channel subinterfaces of a group in accordance with one or more embodiments described herein. The method for assigning anchor interfaces to port channel subinterfaces shown in FIG. 2B is only one example of a particular scheme for assigning anchor interfaces to port channel subinterfaces of a group. Accordingly, embodiments described herein should not be considered limited to the specific process shown in FIG. 2B.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that steps other than those shown in FIG. 2B may be performed.

In Step 220, based on a determination in Step 202 of FIG. 2A that a subinterface for which a shape rate configuration is requested is part of a subinterface group, a further determination is made as to whether the subinterface group has already been assigned to a physical interface of a port group. In one or more embodiments, if the group has already been assigned to a physical interface, the method proceeds to Step 222. In one or more embodiments, if the group has not already been assigned to a physical interface, the method proceeds to Step 224.

In Step 222, the port channel subinterface is assigned to the same physical interface as the group to which the subinterface belongs, such that the subinterfaces of the group have the same anchor interface. In one or more embodiments, after assigning anchor interface of the group to the subinterface, the method returns to Step 218 of FIG. 2A.

In Step 224, an anchor interface assigner performs a discovery of physical interfaces of a port channel. In one or more embodiments, the port channel is a port channel that is associated with the port channel subinterface. In one or more embodiments, the physical interfaces are the set of interfaces that are aggregated to form the port channel of a network device. The discovery of the physical interfaces of the port channel may be performed using any scheme for discovering information of a network device. In one or more embodiments, each physical interface in the set has a total bandwidth that is greater than or equal to the shape rate requested in Step 200 of FIG. 2A and/or of the shape rate of the group of which the subinterface is a member.

As an example, an anchor interface assigner may perform a query to port channel information stored in storage of a network device, and the query may return a listing of the physical interfaces of the port channel. In one or more embodiments, the query returns the list of physical interfaces, along with additional information associated with the physical interfaces. Such information may include, but is not limited to, the total bandwidth for the physical interface, whether the physical interface is currently operational, the total number of subinterfaces associated with the physical interface, the amount of bandwidth allocated to the physical interface to facilitate shape rates for subinterfaces associated with the physical interface, etc. Any other items of information associated with physical interfaces may be included with the list of physical interfaces without departing from the scope of embodiments described herein.

In Step 226, a set (e.g., a list) of physical interfaces is generated, along with the allocated bandwidth for each physical interface in the set. In one or more embodiments, the allocated bandwidth for each physical interface represents the aggregate bandwidth of the shape rates of port channel subinterfaces associated with the physical interface, which may include the shape rates configured for one or more subinterface groups for which the physical interfaces are assigned as anchor interfaces. In one or more embodiments, the allocated bandwidth is less than the total amount of bandwidth of the physical interface. In one or more embodiments, the allocated bandwidth is equal to or greater than the total bandwidth of the physical interface (e.g., the physical interface is over-subscribed).

In one or more embodiments, generating the set includes filtering the set to remove one or more physical interfaces. A physical interface may be removed from the set for any reason. As an example, a physical interface may be removed because the physical interface is currently down. As another example, a physical interface may be removed because the physical interface already has a quantity of subinterfaces associated with it that is equal to a physical interface subinterface limit. In one or more embodiments, the generating of the set of physical interfaces is performed by an anchor interface assigner.

In Step 228, the set of physical interfaces generated in Step 226 is ranked based on allocated bandwidth. In one or more embodiments, the ranking orders the physical interfaces according to allocated bandwidth, with physical interfaces having more allocated bandwidth being lower on the ranked list than physical interfaces having less allocated bandwidth. In one or more embodiments, the ranking of the set of physical interfaces is performed by an anchor interface assigner.

In Step 230, a determination is made as to whether a tie exists between the physical interfaces having the lowest amount of allocated bandwidth of the ranked list of physical interfaces. In one or more embodiments, a tie exists when two or more physical interfaces have the same amount of allocated bandwidth. In one or more embodiments, if an allocated bandwidth tie exists, the method proceeds to Step 234. In one or more embodiments, if there is no allocated bandwidth tie, the method proceeds to Step 232.

In Step 232, the physical interface having the lowest allocated bandwidth is selected from the set. In one or more embodiments, the selected physical interface is the interface at the top of the ranked list of physical interfaces created in Step 208. In one or more embodiments, after Step 232, the method proceeds to Step 236.

In Step 234, the physical interface having the lowest allocated bandwidth for groups is selected from the physical interfaces having a tie for allocated bandwidths determined in Step 230. In one or more embodiments, the lowest allocated bandwidth for groups is the amount of bandwidth already allocated to a physical interface to facilitate the shape rate(s) of one or more groups of subinterfaces. The physical interface having the lowest amount of bandwidth allocated for subinterface groups may be any physical interface of the set of physical interfaces that had an allocated bandwidth that was tied with one or more physical interfaces of the set of physical interfaces.

In Step 236, the physical interface selected in Step 232 or Step 234 is assigned to the subinterface for which the request in Step 200 of FIG. 2A was received, as the anchor interface for the port channel subinterface. In one or more embodiments, the assignment is made using any scheme for associating items with one another. For example, the assignment may be a stored association between the physical interface and the subinterface stored in storage and/or memory of a network device. In one or more embodiments, the anchor interface is assigned for both the subinterface, and for the group of subinterfaces to which the subinterface belongs.

In Step 238, the shape rate for the port channel subinterface group is applied. In one or more embodiments, applying the shape rate includes configuring the physical interface to allow network traffic to be transmitted from and/or received by the subinterface in an amount that is less than or equal to the shape rate for the subinterface. In one or more embodiments, the shape rate for the subinterface that is applied is the shape rate for the group of which the subinterface is a member. As an example, a shape rate of 5 Gbps may be configured for a subinterface (or group), after which network traffic to be sent from and/or received by the subinterface may be any quantity from 0 Gbps to 5 Gbps. In one or more embodiments, a shape rate may be applied to a group, and to a subinterface that is a member of the group. As an example, a group of two subinterfaces may be configured with a shape rate of 5 Gbps. In such a scenario, a first subinterface of the group may be configured with an individual shape rate of 3 Gbps, while the other subinterface has no individual shape rate configured, and could thus carry network traffic up to the 5 Gbps shape rate of the group.

In Step 240, the shape rate for the subinterface group of which the subinterface is a member is added to the allocated bandwidth associated with the physical interface. In one or more embodiments, adding the shape rate includes adding the quantity of bits per second of the shape rate to the aggregate amount of bandwidth allocated to the physical interfaces for other subinterfaces associated with the physical interface. In one or more embodiments, after Step 240, the method returns to Step 218 of FIG. 2A.

Figure 2C:
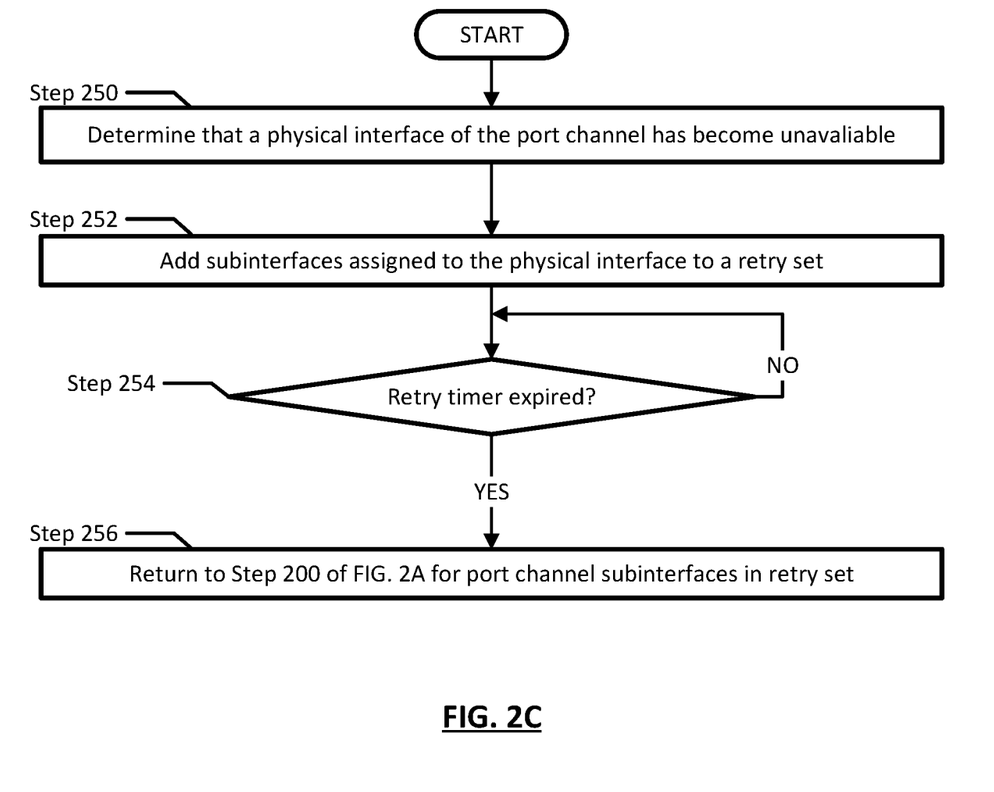
FIG. 2C shows a flowchart of a method for distributing port channel subinterfaces after an interface of a port channel becomes unavailable in accordance with one or more embodiments described herein.

FIG. 2C shows a flowchart describing a method for assigning an anchor interface for port channel subinterfaces after an interface of a port channel becomes unavailable in accordance with one or more embodiments described herein. The method for assigning anchor interfaces to port channel subinterfaces shown in FIG. 2C is only one example of a particular scheme for assigning anchor interfaces to port channel subinterfaces of a group. Accordingly, embodiments described herein should not be considered limited to the specific process shown in FIG. 2C.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that steps other than those shown in FIG. 2C may be performed.

In Step 250, a determination is made that a physical interface of a port channel has become unavailable. In one or more embodiments, a port channel physical interface may become unavailable for any reason. As an example, an error may occur that causes a physical interface to go down. As another example, the connection (e.g., cable) to a physical interface may become unplugged.

In Step 252, subinterfaces that were assigned to the unavailable interface are added to a retry set. In one or more embodiments, any number of subinterfaces and/or subinterface groups may have been assigned to a physical interface that becomes unavailable. For example, subinterfaces may have been assigned a physical interface as an anchor interface as discussed above in the descriptions of FIG. 2A and/or FIG. 2B. In one or more embodiments, a retry set is a listing of subinterfaces that do not have an assigned anchor interface, which may be due to an assigned anchor interface becoming unavailable. A retry set may be a data construct of any type and may be stored in any memory and/or storage of a network device.

In Step 254, a determination is made as to whether a retry timer has expired. In one or more embodiments, a retry timer is any hardware, software, or combination thereof that has the ability to count time in any interval. In one or more embodiments, a retry timer expires at the end of a retry time period, which may be any period of time. In one or more embodiments, if the retry timer has not expired, the method returns to Step 254 until the retry timer expires. In one or more embodiments, if the retry timer has expired, the method returns to Step 200 of FIG. 2A to assign an anchor interface to subinterfaces in the retry set, as shown in Step 256.

Figure 2D:
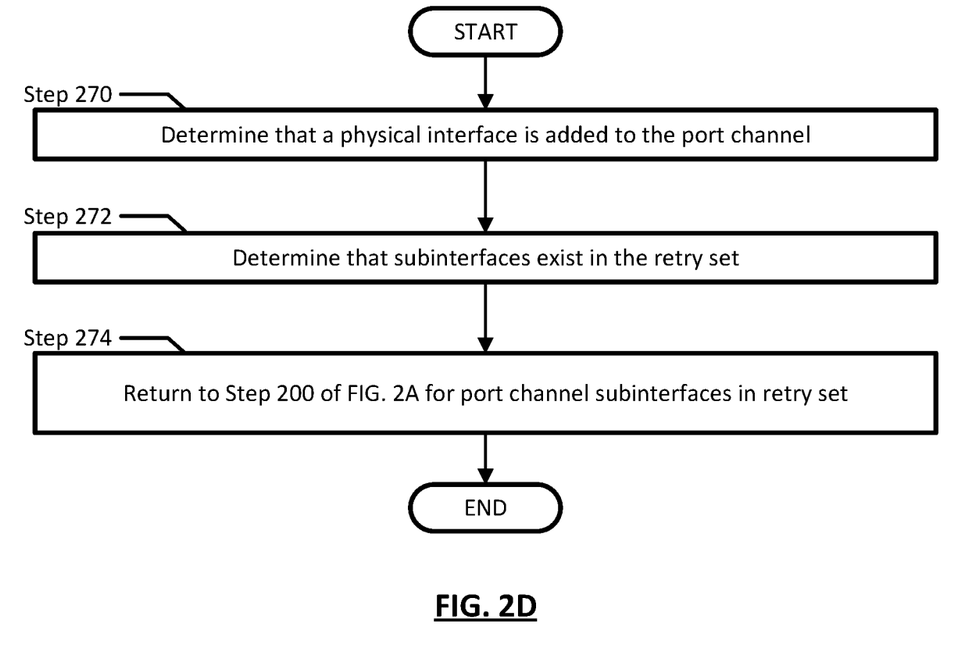
FIG. 2D shows a flowchart of a method for distributing port channel subinterfaces after an interface is added to a port channel in accordance with one or more embodiments described herein.

FIG. 2D shows a flowchart describing a method for assigning an anchor interface for port channel subinterfaces after an interface is added to a port channel in accordance with one or more embodiments described herein. The method for assigning anchor interfaces to port channel subinterfaces shown in FIG. 2D is only one example of a particular scheme for assigning anchor interfaces to port channel subinterfaces of a group. Accordingly, embodiments described herein should not be considered limited to the specific process shown in FIG. 2D.

While the various steps in the flowchart shown in FIG. 2D are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that steps other than those shown in FIG. 2D may be performed.

In Step 270, a determination is made that a physical interface has been added to a port channel. In one or more embodiments, a port channel physical interface may be added to a port channel for any reason. For example, an entity may want a port channel of a network device to have a higher aggregate total bandwidth, and, therefore, configure the port channel to include an additional physical interface.

In Step 272, a determination is made that a retry set includes subinterfaces. In one or more embodiments, the determination is made by checking the listing of interfaces in the retry set and finding that it includes one or more subinterfaces. In one or more embodiments, the subinterfaces in the retry set are there for any reason, such as a physical interface to which they were previously assigned as an anchor interface becoming unavailable.

In one or more embodiments, based on the determination that subinterfaces exist in the retry set, the method returns to Step 200 of FIG. 2A to assign an anchor interface to subinterfaces in the retry set, as shown in Step 274.

Figure 2E:
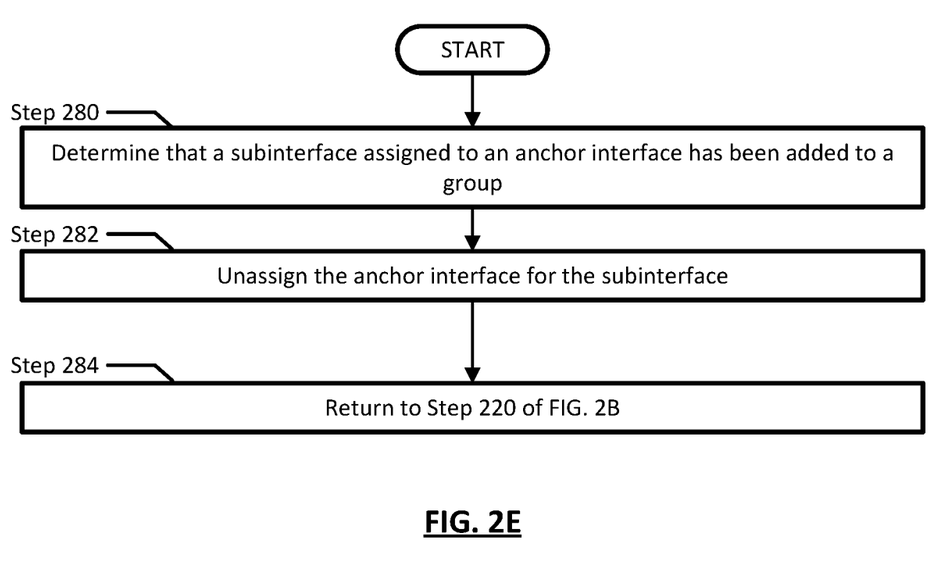
FIG. 2E shows a flowchart of a method for distributing port channel subinterfaces after a subinterface is added to group in accordance with one or more embodiments described herein.

FIG. 2E shows a flowchart describing a method for assigning an anchor interface for port channel subinterfaces after an interface is added to a port channel in accordance with one or more embodiments described herein. The method for assigning anchor interfaces to port channel subinterfaces shown in FIG. 2E is only one example of a particular scheme for assigning anchor interfaces to port channel subinterfaces of a group. Accordingly, embodiments described herein should not be considered limited to the specific process shown in FIG. 2E.

While the various steps in the flowchart shown in FIG. 2E are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that steps other than those shown in FIG. 2E may be performed.

In Step 280, a determination is made that a subinterface that is assigned to a physical interface as an anchor interface has been added to a group of subinterfaces. In one or more embodiments, a subinterface may be added to a group for any reason, at any time, and using any technique for adding a subinterface to a group. As an example, an administrator of a network device may use a CLI to enter one or more commands to add a subinterface to a subinterface group.

In Step 282, based on the determination of Step 280 that the subinterface is added to a subinterface group, the anchor interface for the subinterface is unassigned. In one or more embodiments, unassigning the subinterface includes, but is not limited to, removing the association between the subinterface and the physical interface, and subtracting the shape rate of the subinterface from the allocated bandwidth amount for the physical interface.

In Step 284, the method returns to Step 220 of FIG. 2B to assign a new anchor interface for the new group member subinterface.

Figure 3A:
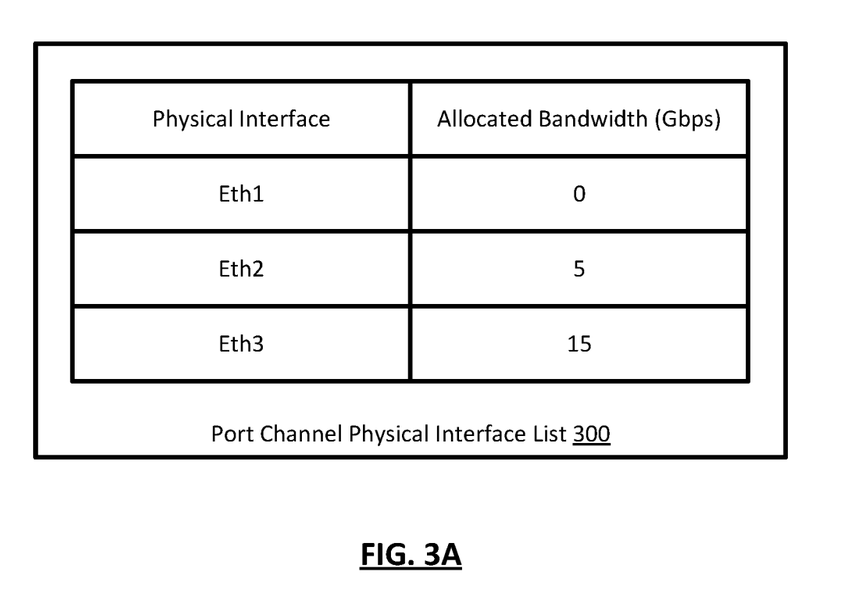
FIG. 3A and FIG. 3B show an example in accordance with one or more embodiments of described herein.
Figure 3B:
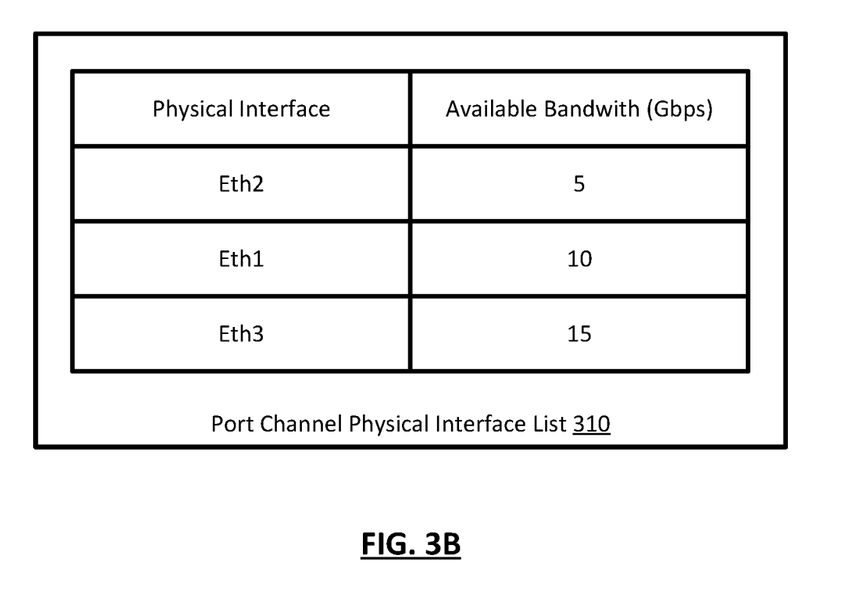

FIG. 3A and FIG. 3B show an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3A, consider a scenario in which a network device has a port channel configured with three physical interfaces, Eth1, Eth2, and Eth3. Eth1 is not assigned as the anchor interface for any subinterfaces, and thus has 0 allocated bandwidth. Eth2 is the anchor interface for subinterfaces for which the allocated bandwidth to facilitate shape rates for the subinterfaces is 5 Gbps. Eth3 is the anchor interface for subinterfaces for which the allocated bandwidth to facilitate shape rates for the subinterfaces is 15 Gbps.

In such a scenario, a request to configure a shape rate of 10 Gbps for a subinterface is received by an anchor interface assigner of the network device. The anchor interface assigner first determines that the subinterface is not a part of a subinterface group. Therefore, the anchor interface assigner performs a discovery of the three physical interfaces of the port channel. None of the physical interfaces are unavailable, so no physical interfaces are filtered from the set. The discovery process also yields an allocated bandwidth for each of the three physical interfaces.

Next, the physical interfaces are ranked based on allocated bandwidth. The results of the ranking are shown in FIG. 3A as port channel interface list (300). Based on the ranking shown in FIG. 3A, Eth1 is selected, because Eth1 has the lowest allocated bandwidth. Based on the selection, Eth1 is assigned as the anchor interface for the subinterface for which configuration of a shape rate was requested, and the shape rate is applied for the subinterface.

Next, the shape rate of 10 Gbps for the subinterface is added to the allocated bandwidth of 0 for Eth1, making the new allocated bandwidth for Eth1 10 Gbps. Accordingly, the next time configuration of a shape rate for a subinterface of the port channel is requested, the ranked list generated by the anchor interface assigner reflects the updated allocated bandwidth for Eth1, as shown in FIG. 3B as port channel interface list (310).

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A method for configuring a first port channel subinterface to send associated network traffic through a corresponding one of a plurality of physical interfaces of a port channel of a network device, the method comprising:

receiving, by an anchor interface assigner, a first request to configure a first shape rate for a first port channel subinterface, wherein the shape rate is an amount of bandwidth that the first port channel subinterface is allowed to use, and wherein the first port channel subinterface is capable of being assigned to any of a plurality of physical interfaces of a port channel;

initiating, by the anchor interface assigner, a discovery process, based on the first request, to identify the plurality of physical interfaces, wherein the plurality of physical interfaces comprises a first physical interface and a second physical interface;

generating, by the anchor interface assigner, using the identified plurality of physical interfaces, a physical interface set specifying:

the first physical interface and a first allocated bandwidth associated with the first physical interface, wherein the first allocated bandwidth is a configurable amount of bandwidth allowed to be used on the first physical interface, wherein the first allocated bandwidth is distinct from a first amount of network traffic through the first physical interface, and wherein the first amount of network traffic through the first physical interface is no more than the first allocated bandwidth; and the second physical interface and a second allocated bandwidth associated with the second physical interface, wherein the second allocated bandwidth is a configurable amount of bandwidth allowed to be used on the second physical interface, wherein the second allocated bandwidth is distinct from a second amount of network traffic through the second physical interface, and wherein the second amount of network traffic through the second physical interface is no more than the second allocated bandwidth;

making a selection, by the anchor interface assigner, using the physical interface set, of the first physical interface based on the first allocated bandwidth being lesser than the second allocated bandwidth;

assigning, by the anchor interface assigner, the first physical interface as a first anchor interface for the first port channel subinterface, wherein any network traffic received or transmitted by the first port channel subinterface is sent through the first anchor interface;

adding, by the anchor interface assigner, the first shape rate to the first allocated bandwidth to obtain a first new allocated bandwidth for the first physical interface, the first new allocated bandwidth being no greater than a physical bandwidth of the first physical interface, wherein the first new allocated bandwidth is used in a future anchor interface assignment; and transmitting and receiving, by the first port channel subinterface after the future anchor interface assignment, network traffic through the first anchor interface, the network traffic having a rate which is no more than the first shape rate.

2. The method of claim 1, wherein the physical interface set further comprises a third physical interface, and the method further comprises:

before making the selection, filtering the physical interface set to remove the third physical interface based on the third physical interface being unavailable or the third physical interface having a maximum limit of subinterfaces configured.

3. The method of claim 1, wherein the physical interface set is sorted based on allocated bandwidths of each physical interface of the plurality of physical interfaces in the physical interface set.

4. The method of claim 1, wherein each physical interface of the plurality of physical interfaces has a bandwidth limit that is greater than the first shape rate.

5. The method of claim 1, wherein the first shape rate is a first group shape rate, and the method further comprises:

receiving a second request to configure a second shape rate for a second port channel subinterface;

making a first determination that the second port channel subinterface and the first port channel subinterface are members of a first subinterface group; and assigning, based on the first determination, the first physical interface as the first anchor interface for the second port channel subinterface without adding the second shape rate to the first new allocated bandwidth.

6. The method of claim 5, wherein, after adding the first shape rate to the first allocated bandwidth, the first new allocated bandwidth is equal to the second allocated bandwidth, and the method further comprises:

receiving a third request to configure a third shape rate for a third port channel subinterface;

making a second determination that the third port channel subinterface is a member of a second subinterface group associated with a second group shape rate;

making a third determination that a portion of the second allocated bandwidth corresponding to subinterface groups is less than a portion of the first allocated bandwidth corresponding to subinterface groups;

assigning, based on the second determination and the third determination, the second physical interface as a second anchor interface for the third port channel subinterface; and adding the second group shape rate to the second allocated bandwidth to obtain a second new allocated bandwidth for the second physical interface.

7. The method of claim 1, further comprising, after assigning the first physical interface as the first anchor interface for the first port channel subinterface:

making a determination that the first physical interface is unavailable;

adding the first port channel subinterface to a retry set associated with a retry timer; and assigning, after the retry timer expires, the second physical interface as a second anchor interface for the first port channel subinterface.

8. The method of claim 1, further comprising:

adding a third physical interface to the port channel;

making a determination, after the adding the third physical interface to the port channel, that a third port channel subinterface is present in a retry set; and assigning, based on the determination, the third physical interface as a second anchor interface for the third port channel subinterface.

9. The method of claim 1, further comprising:

making a determination that the first port channel subinterface is added to a subinterface group; and unassigning, based on the determination, the first physical interface as the first anchor interface for the first port channel subinterface.

10. A non-transitory computer readable medium comprising computer readable program code, which when executed by a computer processor enables the computer processor to perform a method for configuring a first port channel subinterface to send associated network traffic through a corresponding one of a plurality of physical interfaces of a port channel, the method comprising:

receiving a first request to configure a first shape rate for a first port channel subinterface, wherein the shape rate is an amount of bandwidth that the first port channel subinterface is allowed to use, and wherein the first port channel subinterface is capable of being assigned to any of a plurality of physical interfaces of a port channel, wherein the plurality of physical interfaces comprises a first physical interface and a second physical interface;

generating a physical interface set specifying:

the first physical interface and a first allocated bandwidth associated with the first physical interface, wherein the first allocated bandwidth is a configurable amount of bandwidth allowed to be used on the first physical interface, wherein the first allocated bandwidth is distinct from a first amount of network traffic through the first physical interface, and wherein the first amount of network traffic through the first physical interface is no more than the first allocated bandwidth; and the second physical interface and a second allocated bandwidth associated with the second physical interface, wherein the second allocated bandwidth is a configurable amount of bandwidth allowed to be used on the second physical interface, wherein the second allocated bandwidth is distinct from a second amount of network traffic through the second physical interface, and wherein the second amount of network traffic through the second physical interface is no more than the second allocated bandwidth;

making a selection, using the physical interface set, of the first physical interface based on the first allocated bandwidth being lesser than the second allocated bandwidth;

assigning the first physical interface as a first anchor interface for the first port channel subinterface, wherein any network traffic received or transmitted by the first port channel subinterface is sent through the first anchor interface;

adding the first shape rate to the first allocated bandwidth to obtain a first new allocated bandwidth for the first physical interface which is no greater than a physical bandwidth of the first physical interface; and enabling the first port channel subinterface to transmit and receive network traffic through the first anchor interface after the future anchor interface assignment, the network traffic having a rate which is no more than the first shape rate.

11. The non-transitory computer readable medium of claim 10, wherein the physical interface set further comprises a third physical interface, and the method further comprises:

before making the selection, filtering the physical interface set to remove the third physical interface based on the third physical interface being unavailable or the third physical interface having a maximum limit of subinterfaces configured.

12. The non-transitory computer readable medium of claim 10, wherein the physical interface set is sorted based on allocated bandwidths of each physical interface of a plurality of physical interfaces in the physical interface set.

13. The non-transitory computer readable medium of claim 10, wherein each physical interface of the plurality of physical interfaces has a bandwidth limit that is greater than the first shape rate.

14. The non-transitory computer readable medium of claim 10, wherein the first shape rate is a first group shape rate, and the method further comprises:

receiving a second request to configure a second shape rate for a second port channel subinterface;

making a first determination that the second port channel subinterface and the first port channel subinterface are members of a first subinterface group; and assigning, based on the first determination, the first physical interface as the first anchor interface for the second port channel subinterface without adding the second shape rate to the first new allocated bandwidth.

15. The non-transitory computer readable medium of claim 14, wherein, after adding the first shape rate to the first allocated bandwidth, the first new allocated bandwidth is equal to the second allocated bandwidth, and the method further comprises:

receiving a third request to configure a third shape rate for a third port channel subinterface;

making a second determination that the third port channel subinterface is a member of a second subinterface group associated with a second group shape rate;

making a third determination that a portion of the second allocated bandwidth corresponding to subinterface groups is less than a portion of the first allocated bandwidth corresponding to subinterface groups;

assigning, based on the second determination and the third determination, the second physical interface as a second anchor interface for the third port channel subinterface; and adding the second group shape rate to the second allocated bandwidth to obtain a second new allocated bandwidth for the second physical interface.

16. The non-transitory computer readable medium of claim 10, wherein the method performed by executing the computer readable program code further comprises, after assigning the first physical interface as the first anchor interface for the first port channel subinterface:

making a determination that the first physical interface is unavailable;

adding the first port channel subinterface to a retry set associated with a retry timer; and assigning, after the retry timer expires, the second physical interface as a second anchor interface for the first port channel subinterface.

17. The non-transitory computer readable medium of claim 10, wherein the method performed by executing the computer readable program code further comprises:

adding a third physical interface to the port channel;

making a determination, after the adding the third physical interface to the port channel, that a third port channel subinterface is present in a retry set; and assigning, based on the determination, the third physical interface as a second anchor interface for the third port channel subinterface.

18. The non-transitory computer readable medium of claim 10, wherein the method performed by executing the computer readable program code further comprises:

making a determination that the first port channel subinterface is added to a subinterface group; and unassigning, based on the determination, the first physical interface as the first anchor interface for the first port channel subinterface.

19. A system for distributing subinterfaces among physical interfaces of a port channel, the system comprising:

a network device comprising:
    a processor;
    memory;
    a plurality of physical interfaces; and
    an anchor interface assigner, comprising circuitry, executing on the processor and using the memory, and configured to:
        receive a request to configure a shape rate for a port channel subinterface, wherein the shape rate is an amount of bandwidth that the first port channel subinterface is allowed to use, and wherein the first port channel subinterface is capable of being assigned to any of the plurality of physical interfaces of a port channel; and
        select, in response to the request, a physical interface of the plurality of physical interfaces having a lowest allocated bandwidth as an anchor interface for the port channel subinterface, wherein the allocated bandwidth is distinct from an amount of network traffic through the physical interface, and wherein the amount of network traffic through the physical interface is no more than the allocated bandwidth, wherein any network traffic received or transmitted by the first port channel subinterface after the anchor interface selection is sent through the first anchor interface, the network traffic having a rate which is no more than the shape rate, the allocated bandwidth of the selected physical interface being a configurable amount of bandwidth allowed to be used on the selected physical interface, the allocated bandwidth being no greater than a physical bandwidth of the selected physical interface.

20. The system of claim 19, wherein the anchor interface assigner is further configured to:

add the shape rate to the lowest allocated bandwidth to obtain a new allocated bandwidth for the selected physical interface.

* * * * *

UNITED STATES PATENT AND TRADEMARK OFFICE
CERTIFICATE OF CORRECTION

| | |
|---|---|
| PATENT NO. | : 11,799,795 B2 |
| APPLICATION NO. | : 17/333240 |
| DATED | : October 24, 2023 |
| INVENTOR(S) | : Athichart Tangpong, Rajnish Gupta and Francois Labonte |

It is certified that error appears in the above-identified patent and that said Letters Patent is hereby corrected as shown below:

On the Title Page

Item (54) Title and in the Specification Column 1, Lines 1-2:
Delete "SUB INTERFACES"
And insert --SUBINTERFACES--

Signed and Sealed this
Ninth Day of January, 2024

Katherine Kelly Vidal
*Director of the United States Patent and Trademark Office*